Feb. 7, 1967   C. S. GENTSCH   3,302,388
FLUSH RIVETED CHAIN
Filed June 25, 1964
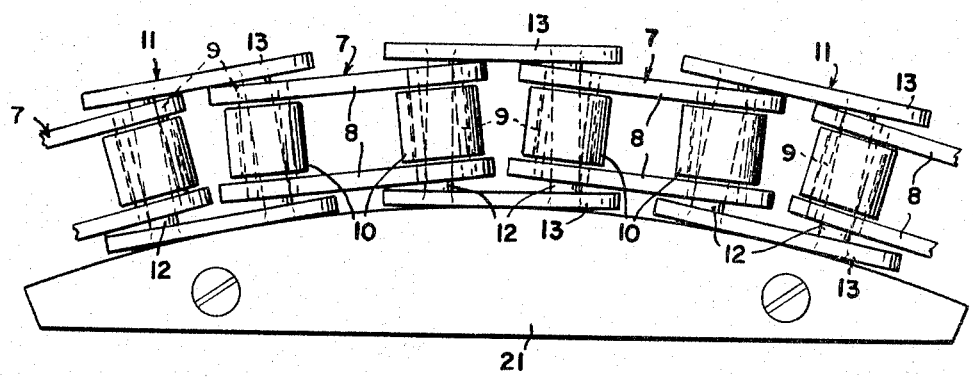
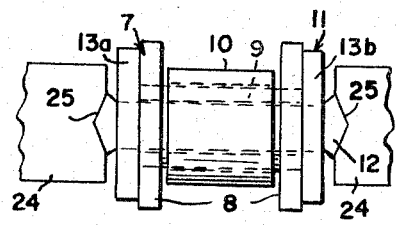
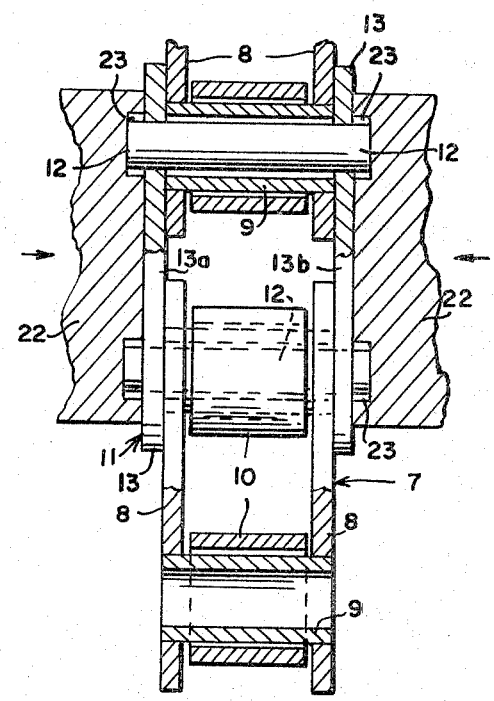
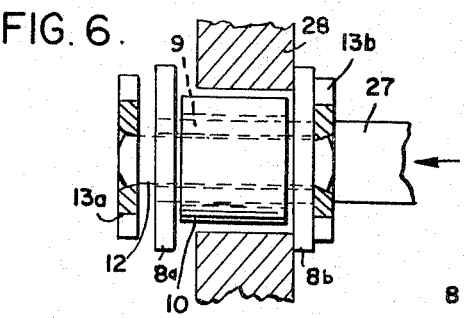

United States Patent Office 3,302,388
Patented Feb. 7, 1967

3,302,388
FLUSH RIVETED CHAIN
Charles Stewart Gentsch, Longmeadow, Mass., assignor to Rex Chainbelt Inc., Milwaukee, Wis., a corporation of Wisconsin
Filed June 25, 1964, Ser. No. 377,938
5 Claims. (Cl. 59—8)

This invention relates to the securement of the pins in the outer side plates of roller chain without the ends of the pins projecting from the side plates and more particularly relates to such roller chain which is generally referred to as flush-riveted chain.

The invention is intended for use in roller chain which in operation is guided laterally by stationary means over which the outer side plates or pin plates of the chain slide and is particularly adapted to such chain which for the same purpose requires a given larger operating clearance between the pin plates and the adjacent links through which the pins extend.

The type of chain referred to, namely roller chain, includes alternate bushing links and pin links. Each bushing link comprises a spaced pair of bushings and a spaced pair of bushing plates which are press fit on the corresponding ends of the bushings. Where employed, the rollers are free to turn on the bushings between the bushing plates.

Each pin link comprises two pins and a pair of pin plates having corresponding holes through which the ends of the pins extend. The pin links are assembled with two pins extending through the proximate bushings of adjacent bushing links and the pin plates are then press fit on the corresponding projecting ends of the pins to form a pin link. The pin plates overlie the bushing plates and the projecting ends of the pins are generally headed, or may be provided with a locking attachment which positively secures the plates on the pins.

The associated pin and bushing of adjacent links are generally referred to as a chain joint about which the two links may articulate, particularly as in operation over a sprocket. A uniform or regular spacing between axes of the chain joints is required and such spacing is referred to as the chain pitch. An imaginary line or plane joining the axes of the chain joints is referred to as the pitch line of the chain.

According to the present invention, after chain assembly the pin plates are pushed on the pins tight against the adjacent links. The pins are then headed and the headed ends are forced into the pin plates. The heading of the pin, as will be described, is such that the resulting plastic deformation of the plates secures the plates on the pins and also secures the pins against rotation in the plates. The steps described also provide the chain with a suitable clearance between the plates of the links to allow the lateral flexing for which the chain is intended.

The drawings furnished herewith illustrate the best mode of carrying out the invention as presently contemplated and set forth hereinafter.

In the drawings:

FIGURE 1 is a plan view of the chain shown operating around a shoe and flexing laterally;

FIG. 2 is an enlarged side elevation of a pin link and parts of adjacent bushing links joined by the pin link;

FIG. 3 is a section through the pitch line of the chain showing parts of two bushing links and assembly of the pin plates on the pins of the intermediate pin link;

FIG. 4 is a section taken laterally through the chain showing the heading of the two ends of a pin by means of two V-punches;

FIG. 5 shows the chain on an anvil fitting between rollers and holding the bushing and shows the rammer which has pushed one end of the pin into the pin plate. Both pins of each link must be pushed into the link simultaneously as shown; and FIG. 6 is a view similar to FIG. 5 showing the other end of one of the two pins after having been pushed into the pin plate on the opposite side of the chain.

Each bushing link 7 of the chain shown in the drawings includes two bushing plates 8 having spaced holes in which the corresponding ends of the bushings 9 are pressed and secured. Rollers 10 on bushings 9 may be employed to protect the bushings against sprocket wear and damage by the teeth of the sprocket.

Each pin link 11 connects two adjacent bushing links 7 and includes the pins 12 extending through the two proximate bushings of adjacent links 7, and the two pin plates 13. Each pin 12 is turnable in the respective bushing 9 and in the chain shown and described, the pins are provided sufficient clearance and length to allow their extending diagonally through bushings 9 for lateral flexing of the chain and operation "around corners." Sufficient pin length is also required because the final spacing of the pin plates 13 on each pin must be sufficient to allow the required angularity of the bushing link.

Pin plates 13 are secured on the ends of pins 12 without projecting heads, which would interfere with the guiding of the chain in operating, for example, over the shoe 21.

According to the present invention, each link 11 is first assembled with bushings 7 as shown in FIG. 3 wherein the pin plates 13a and 13b are pressed against bushing links 7 by the mandrels 22. Each mandrel 22 is provided with recesses 23 to receive the projecting ends of pins 12. The depth of recesses 23 is predetermined and equal whereby the pins are approximately centered or so that their ends project approximately equally from plates 13a and 13b.

The projecting ends of pins 12 are then headed as shown in FIG. 4 by means of the punches 24 having two angularly disposed working faces 25 which plastically deform the ends of the pin. The faces 25 form a groove which is parallel to the pitch line of the chain and are disposed so that the metal from the ends of the pins 12 is displaced in directions normal to the pitch line of the chain. This direction is essential as will be described.

The corresponding ends of both pins 12 of each pin link 7 are then pushed into plates 13a and 13b in two steps by means of the rammers 26 and 27 shown in FIGS. 5 and 6. For that purpose, the chain is placed on an anvil 28 which projects between rollers 10 and supports the bushing plates 8a and 8b against which the pin plates 12a and 12b are successively pressed. In the first step, rammer 26 forces the ends of pins 12 into pin link 13a as shown in FIG. 5. In doing so, pins 12 slide a short distance axially in the bushings 9 and a clearance is developed between pin plate 12b and the adjacent bushing plates. In the second step, rammer 27 pushes the opposite ends of pins 12 into pin plate 13b and an additional and final clearance is developed between plates 13 and 8.

The projecting metal of the headed ends of pins 12 which overlies a pin plate 13 is approximately semi-conical and each end of a pin 12 is formed with two such projections which extend in directions normal to the pitch line of the chain. When the headed end of the pin is pushed into the plate, the projections as a result deform the hole of the plate to correspond therewith. Since the metal of plates 8 and 13 is heat treated for resistance to fatigue and that of the pins 12 for resistance to wear, such a result is readily assured or accomplished without having to compromise such or other requirements of good chain design.

The resulting interlocking of the pin plates 13 on pins 12 is also particularly secure considering the fact that the end of the pin is flush with the plate and, according to the invention, the fatigue resistance of the plate is not reduced and is, in fact, likely to be increased by the cold working of the edges of the holes of the pin plates.

The chain shown in the drawings is flush riveted on both sides thereof. Where flush riveting on one side only is sufficient, the chain may be considered completed with the step shown in FIG. 5 of the drawings.

Various modes of carrying out the invention are contemplated as within the scope of the following claims particularly pointing out and distinctly claiming the subject matter which is regarded as the invention.

I claim:

1. The method of flush riveting one side of the pin link of a chain including pin links and bushing links in an alternate series, the said pin link comprising pins extending through the adjacent bushings and pin plates having spaced holes into which the ends of said pins extend with a tight fit, which method comprises first shifting the pin plate on said pins so that the ends of said pins project therefrom on said one side of the chain, heading said ends of the pins to enlarge the same by displacing portions thereof in directions normal to the pitch line of the chain, and thereafter simultaneously forcing said ends of the pins into said pin plate.

2. The method of flush riveting a chain including pin links and bushing links in an alternate series, each pin link comprising pins extending through adjacent bushings and pin plates having spaced holes into which the ends of said pins extend with a tight fit, which method comprises first shifting the plates on the pins against the intermediate bushing links, heading the ends of the pins to enlarge the same by displacing portions of the pins in directions normal to the pitch line of the chain, and thereafter successively forcing the corresponding ends of the pins into each of the plates.

3. The method of flush riveting one side of the pin link of a metal chain including pin links and bushing links in an alternate series, the said pin link comprising pins extending through the adjacent bushings and pin plates having spaced holes into which the ends of said pins extend with a tight fit, the metal of said pins being hardened for resistance to wear and the metal of said pin plates being relatively less hard for the necessary greater resistance to fatigue, which method comprises first assembling the pin plate on said pins so that the ends of said pins project therefrom on said one side of the chain, heading said ends of the pins to enlarge the same by displacing portions thereof in directions normal to the pitch line of the chain, and thereafter simultaneously applying a force against said ends of the pins into said pin plate which force moves said enlarged ends of the pins into the plates and reforms the holes thereof to correspond with said ends of the pins whereby the latter are then retained.

4. The method of flush riveting a chain of metal construction including pin links and bushing links in an alternate series, each pin link comprising pins extending through adjacent bushings and pin plates having spaced holes into which the ends of said pins extend with a tight fit, which method comprises first assembling the plates on the pins against the intermediate bushing links, heading the ends of the pins by displacing portions of the pins in directions normal to the pitch line of the chain so that said portions have a tapered cross section which is maximum at the ends of the pin, and thereafter succesively forcing corresponding ends of the pins of each of the plates into the holes of the plates whereby parts of the plates are displaced by said projecting portions and the corresponding tapered cross section of the holes of the plates provides their securement on the pins.

5. The method of flush riveting the heads of the pins on at least one side of a chain of metal construction which chain includes pin links and bushing links in an alternate series, each pin link including pins extending through the adjacent bushings and pin plates having spaced holes into the which the ends of said pins extend with a tight fit, the metal of said pins being hardened for resistance to wear and the metal of said pin plates being relatively less hard for the necessary greater resistance to fatigue, which method comprises first assembling the pin plates on said pins so that the corresponding ends of said pins project from the plates on said one side of the chain, heading said ends of the pins to enlarge the same by displacing portions thereof in directions normal to the pitch line of the chain, and thereafter simultaneously applying a force against said ends of the pins such that said force moves said enlarged ends of the pins into the plates and reforms the holes thereof to correspond with said ends of the pins whereby said plates are then retained on said pins.

References Cited by the Examiner

UNITED STATES PATENTS

| | | | |
|---|---|---|---|
| 2,816,453 | 12/1957 | Frank | 74—251 |
| 3,141,347 | 7/1964 | Onulak | 74—250 |

CHARLES W. LANHAM, *Primary Examiner.*

G. P. CROSBY, *Assistant Examiner.*